Patented Jan. 20, 1925.

1,523,807

UNITED STATES PATENT OFFICE.

BIRGER FJELD HALVORSEN AND ØYSTEIN RAVNER, OF CHRISTIANIA, NORWAY, ASSIGNORS TO NORSK HYDRO-ELEKTRISK KVAELSTOFAKTIESELSKAB, OF CHRISTIANIA, NORWAY.

PROCESS OF WORKING NITRIC-ACID SOLUTIONS CONTAINING ALUMINA AND ALKALIES.

No Drawing.    Application filed March 2, 1922. Serial No. 540,576.

*To all whom it may concern:*

Be it known that we, BIRGER FJELD HALVORSEN and ØYSTEIN RAVNER, citizens of the Kingdom of Norway, residing at Christiania, Norway, have invented certain new and useful Improvements in Processes of Working Nitric-Acid Solutions Containing Alumina and Alkalies, of which the following is a specification.

During the last few years several processes have been published concerning the decomposition of minerals containing alumina by means of acids, whereby acid solutions are obtained. These can be worked up by evaporation until crystallization takes place, the iron having previously been removed by special processes. The whole of the solution can also be evaporated until it dries and then, by partial decomposition, the alumina can be converted into an insoluble form while the alkali metal and alkali earth metal salts remain soluble in water.

When using these processes it is difficult to obtain hydroxide of aluminum that is perfectly free of iron. If the aluminum salts are to be crystallized, this has to take place in acid solutions that make it very difficult to obtain a solution quite free of iron as it attacks the apparatus.

According to the present invention it will now be comparatively easy to produce pure alumina, obtaining at the same time valuable by-products, when producing solutions that contain sufficient quantities of alkaline combinations. If minerals are dissolved like leucite, which is a potassic silicate of aluminum, or if silicates of aluminum containing sodium are dissolved in nitric acid, solutions will be obtained which chiefly consist of the corresponding alkaline and aluminum salts. If minerals are dissolved which are either free of or contain very little alkali metal, the necessary alkali metal can be added in the form of a suitable salt.

It has now been discovered, that during evaporation and heating these solutions are decomposed and turn either into aluminate of sodium or aluminate of potassium. If, however, these solutions are evaporated, it will be found that they soon become thick and sticky and very frothy. It is consequently difficult to finish the decomposition in acid and aluminate during evaporation. The process can then be carried out as follows: The solution is evaporated up to a certain concentration, it is then transferred into a calciner whereupon the formation of aluminate takes place, while the nitric acid or nitrous gases are separated.

During calcination the stuff shows a tendency to stick to the walls of the apparatus and stop it up. This is avoided in accordance with our improvements by adding to the solution from the evaporating apparatus a solid substance or stuff of such nature and in such amount that it prevents melting of the mixture when it enters the calciner and sticking of the same to the walls etc. of the calciner, without introducing any material or permanent deleterious effect in the product or operation. We have found that ferric oxide answers this purpose quite satisfactorily. This dry mass in the calciner, which becomes porous on account of the vapour which develops, gives off water and acid comparatively easily forming aluminates and also forming ferrites when iron oxide has been used. When this mass has been extracted the ferrites are decomposed into ferric oxide and alkali metal hydroxide, while the alumina is dissolved in the form of aluminate. If, from the beginning, there is sufficient alkali metal, the alumina will be obtained in solution, and the extra alkali metal as hydroxide. The strongly alkaline solutions resulting from this process will, after having been filtered, be quite free of iron, and it is consequently unnecessary when using this process, to aim at producing solutions free of iron or to carry out any extra processes for precipitating the iron. Should any insoluble or practically insoluble aluminates, for example alkaline earth metal aluminates, happen to be formed, they can be filtered away together with the ferric oxide so that there will only be alkali metal aluminates and free alkali metal hydroxides in the solution.

The solution of aluminate thus obtained can, for instance, be made into alumina according to the Bayer method, or it can be decomposed by adding carbon dioxide whereby carbonate of sodium or carbonate of potassium and alumina are obtained.

After being calcined the stuff can no longer attack the iron, either when it is solid or during and after extraction. It is consequently quite easy to keep the solution containing aluminum free of iron and it is not necessary to use acid proof apparatus for the last part of the process.

We claim:

1. Process of working nitric acid solutions containing alumina and alkali metal compounds which comprises evaporating the acid solution and then heating it to such a degree that the nitrates react with the alumina forming aluminates, while the nitrogen is expelled in the form of oxygen compounds.

2. Process of working nitric acid solutions containing alumina and alkali metal compounds which comprises evaporating the acid solution in the presence of a solid substance capable of preventing melting and sticking of the mixture solidified by the evaporation, and heating the mass thus solidified to such a degree that the nitrates react with the alumina forming aluminates, while the nitrogen is expelled in the form of oxygen compounds.

3. Process of working nitric acid solutions containing alumina and alkali metal compounds which comprises evaporating the acid solution and adding iron oxide during the evaporation, and heating the mass to such a degree that the nitrates react with the alumina forming aluminates, while the nitrogen is expelled in the form of oxygen compounds.

4. Process of working nitric acid solutions containing alumina and alkali metal compounds which comprises adding an alkali metal compound to the acid solution, evaporating said solution and then heating the mass to such a degree that the nitrates react with the alumina forming aluminates, while the nitrogen is expelled in the form of oxygen compounds.

5. Process of working nitric acid solutions containing alumina and alkali metal compounds which comprises adding an alkali metal compound to the acid solution, evaporating said solution in the presence of a solid substance capable of preventing melting and sticking of the mixture solidified by the evaporation, and heating the mass to such a degree that the nitrates react with the alumina forming aluminates, while the nitrogen is expelled in the form of oxygen compounds.

6. Process of working nitric acid solutions containing alumina and alkali metal compounds which comprises adding an alkali metal compound to the acid solution and evaporating said solution, adding iron oxide during evaporation, and heating the mass to such a degree that the nitrates react with the alumina forming aluminates, while the nitrogen is expelled in the form of oxygen compounds.

In testimony whereof, we affix our signatures.

BIRGER FJELD HALVORSEN.
ØYSTEIN RAVNER.